United States Patent
Kato et al.

(10) Patent No.: US 9,279,186 B2
(45) Date of Patent: Mar. 8, 2016

(54) METAL MEMBER MANUFACTURING METHOD AND METAL MEMBER

(75) Inventors: Hidemi Kato, Sendai (JP); Takeshi Wada, Sendai (JP); Kunio Yubuta, Sendai (JP); Akihisa Inoue, Sendai (JP)

(73) Assignee: TOHOKU UNIVERSITY, Sendai-shi (JP)

( * ) Notice: Subject to any disclaimer, the term of this patent is extended or adjusted under 35 U.S.C. 154(b) by 746 days.

(21) Appl. No.: 13/574,854

(22) PCT Filed: Oct. 22, 2010

(86) PCT No.: PCT/JP2010/068761
§ 371 (c)(1),
(2), (4) Date: Jul. 24, 2012

(87) PCT Pub. No.: WO2011/092909
PCT Pub. Date: Aug. 4, 2011

(65) Prior Publication Data
US 2012/0295129 A1    Nov. 22, 2012

(30) Foreign Application Priority Data
Jan. 28, 2010   (JP) .................................. 2010-016322

(51) Int. Cl.
C23F 4/04       (2006.01)
C23C 26/02      (2006.01)
C23F 1/00       (2006.01)
(Continued)

(52) U.S. Cl.
CPC . *C23C 26/02* (2013.01); *C23F 1/00* (2013.01); *C23F 4/04* (2013.01); *B22F 2998/00* (2013.01); *C22B 9/02* (2013.01); *C22B 26/22* (2013.01); *Y02P 10/234* (2015.11); *Y10T 428/12479* (2015.01)

(58) Field of Classification Search
CPC .......................................................... C23F 4/04
USPC .............................................. 428/613; 216/56
See application file for complete search history.

(56) References Cited

U.S. PATENT DOCUMENTS

| 4,977,038 A | 12/1990 | Sieradzki et al. |
| 5,034,186 A | 7/1991 | Shimamune et al. |
| 2003/0074779 A1* | 4/2003 | Wong .............................. 29/599 |

FOREIGN PATENT DOCUMENTS

| JP | A-62-120403 | 6/1987 |
| JP | A-3-94032 | 4/1991 |

(Continued)

OTHER PUBLICATIONS

Office Action issued in Japanese Application No. 2011-551673 dated Aug. 19, 2014 (with translation).

(Continued)

*Primary Examiner* — Humera Sheikh
*Assistant Examiner* — Lucas Wang
(74) *Attorney, Agent, or Firm* — Oliff PLC

(57) ABSTRACT

A metallic material containing both a second constituent and a third constituent having positive and negative heats of mixing relative to a first constituent, respectively, and including a compound, an alloy or a nonequilibrium alloy having a melting point that is higher than the solidifying point of a metal bath made of the first constituent is placed in the metal bath. The metal bath is controlled to a temperature lower than a minimum value of a liquidus temperature within a range of compositional variations in which the amount of the third constituent in the metallic material decreases down to a point where the metallic material becomes substantially the second constituent so that the third constituent is selectively dissolved into the metal bath.

10 Claims, 3 Drawing Sheets

(51) Int. Cl.
    *C22B 9/02*     (2006.01)
    *C22B 26/22*     (2006.01)

(56) References Cited

FOREIGN PATENT DOCUMENTS

| JP | A-2004-244715 | 9/2004 |
| JP | A-2007-6941 | 1/2007 |
| JP | A-2008-509742 | 4/2008 |
| JP | A-2008-184671 | 8/2008 |
| WO | WO 2007/018189 A1 | 2/2007 |

OTHER PUBLICATIONS

International Search Report issued in International Patent Application No. PCT/JP2010/068761 dated Dec. 21, 2010.

\* cited by examiner

METAL MEMBER MANUFACTURING METHOD AND METAL MEMBER

TECHNICAL FIELD

The present invention relates to a method of manufacturing a metal member having fine pores on a surface or in an entirety thereof as well as to the metal member.

BACKGROUND ART

Attempts have been made for over half a century to add value to metallic materials by making pores therein. Use and development of porous metals are expected to occur in an extremely wide range of applications which include implementation as extra-light materials, high-specific-rigidity materials, energy-absorbing materials, vibration-absorbing materials, soundproofing materials, thermal insulation materials, electrode materials, filter materials, biomedical materials, as well as materials for heat exchangers and oilless bearings, for example. The porous metals also have a high potential as promising materials capable of coping with issues concerning environment, energy and human aging.

Among these metals, porous metallic materials having nanometer-scale fine pores with a pore size of less than 1 μm are highly expected to exhibit high functionality which are unobtainable with conventional materials with respect to catalytic properties, electrode characteristics, gas storage characteristics and sensing characteristics, because the porous metallic materials have significantly large specific surface areas as compared to bulk metallic media. Conventional technology for making porous metallic materials includes a foam melting method, a gas expansion method, a precursor method, a self-propagating, high-temperature synthesis method, a painting method and a spacer method. Pores produced by these methods, however, have a pore size of a few tens of micrometers or larger and it is not easy to reduce this pore size. Thus, porous metallic materials having a pore size controlled to a nanometer scale have been produced chiefly by a dealloying method described below.

The dealloying method is a method of manufacturing a porous medium by removing only a phase whose principal constituent is a less noble metal by dissolving the same in an acid or alkali aqueous solution at room temperature from an alloy or a compound which is characterized by having a complex phase whose principal constituents are a combination of less noble and noble metals having negative and positive standard electrode potentials, respectively, the porous medium being a phase whose principal constituent is a remaining noble metal (refer to Patent Document 1, for example).

Also, metallic materials used as biomedical materials attract attention in recent years. Despite the ever advancing tendency toward a super-aging society which comes from development of medical technology, difficulties for daily life caused by deterioration or loss of functions of various organs will become increasingly serious in the future and, thus, reconstruction of such functions will become an extremely important issue in the medical field. Medical devices using ceramics, polymers and metallic materials have been developed to provide promising means for solving the above problem. The medical devices are broadly classified as follows: orthopedic devices such as artificial joints and bone fixation components; devices for cardiovascular surgery and medicine such as implantable artificial hearts and vascular stents; devices for otolaryngological applications such as artificial inner and middle ears; dental devices such as implants and orthodontic wires; and devices for general surgical applications such as catheters and surgical instruments, for example.

Metallic materials are excellent in various properties, such as moldability, hyperelasticity and shape memory performance. Additionally, metallic materials have excellent strength and toughness as compared to ceramics and polymers. For this reason, approximately 80% of implantable devices whose materials can not be replaced by ceramics or polymers have been developed by using metallic materials. For example, SUS316L stainless steel which is austenitic stainless steel, Ti-6Al-4V ELI, cobalt-chromium (Co—Cr) alloy, Ti-6Al-4Nb, nickel-free stainless steels and nitinol (titanium-nickel (Ti—Ni) shape memory alloy of which atomic percentage of nickel is 48.5 to 51.5%) are widely known and used as typical metallic materials for medical devices.

While metallic materials have high effectiveness as used in medical devices from a viewpoint of strength and toughness, these materials are associated with drawbacks to be overcome at the same time. Generally, when placed in contact with a living tissue, a metallic material ionizes and dissolves due to corrosion, potentially exhibiting a risk of toxicity. It is therefore essential for metallic materials used in medical devices to have high corrosion resistance. Nickel, mercury, cobalt, palladium and chrome are examples of typical metallic elements that can be causes of allergies (allergens), among which nickel-induced allergy is particularly serious. As nickel is noticed also as a carcinogen, individual countries have established nickel elution standards to strengthen their preventive measures. Under such circumstances, new alloys to be used in alloy design for devices using medical metallic materials are being developed primarily on condition that these devices should not contain nickel. A current situation, however, is that this restriction on usable components poses a significant obstacle to alloy development.

A known method for solving the aforementioned problem is a surface reforming method in which nickel is caused to dissolve from the surface of a nickel-containing alloy by using any of various kinds of electrolytic solutions, thereby forming a film containing titanium oxide as a principal constituent with a reduced nickel concentration and suppressing the elution of nickel ions into a living body (refer to Patent Document 2 or 3, for example).

PRIOR ART DOCUMENTS

Patent Document 1: Published Japanese Translation of PCT Application No. 2008-509742

Patent Document 2: International Publication No. 2007/018189

Patent Published Document 3: Japanese Laid-open Patent Application No. 2007-6941

SUMMARY OF THE INVENTION

Technical Problem

Although there exists a successful example of nanoscale pore formation in a noble metallic material, such as gold or silver, as reported on the dealloying method described in Patent Document 1, it is impossible in principle to accomplish nanoscale pore formation in a less noble metallic material so that no successful example has thus far been reported with respect thereto. Accordingly, there has been a problem that it is impossible to manufacture a porous medium having nanometer-scale pores from titanium (Ti), zirconium (Zr), nickel (Ni), chromium (Cr), molybdenum (Mo) or tungsten (W) which have excellent mechanical property and functional property, for instance, by the dealloying method, because these substances have negative-valued standard electrode potentials.

Also, while the surface reforming method described in Patent Documents 2 and 3 has been successful in reducing the nickel concentration to a depth of a few hundreds of nanometers from the surface, titanium oxide simultaneously formed in a surface oxide film is generally brittle and strain at elastic limit of titanium oxide in this film is small compared to that of a metallic material forming a basal part. For this reason, there is a risk that the surface oxide film may break as a result of deformation of the basal part and this can cause nickel ions which will become an allergen to dissolve from the exposed basal part, giving rise to a problem concerning difficulty in biocompatibility.

The present invention has been made, focusing on the aforementioned problems. Accordingly, it is an object of the invention to provide a metal member manufacturing method and the metal member capable of facilitating the manufacture of a porous medium made of a less noble metallic material having nanometer-scale fine pores. It is another object of the invention to provide a metal member manufacturing method and the metal member which make it possible to obtain a metal member having excellent biocompatibility capable of suppressing elution of nickel ions without jeopardizing mechanical properties of a material as an entirety thereof.

Solution to Problem

To accomplish the aforementioned objects, a metal member manufacturing method according to the present invention makes it possible to obtain a metal member having fine openings by placing a metallic material in a metal bath, the metallic material containing both a second constituent and a third constituent having positive and negative heats of mixing relative to a first constituent, respectively, and including a compound, an alloy or a nonequilibrium alloy having a melting point that is higher than the solidifying point of the metal bath made of the first constituent, wherein the metal bath is controlled to a temperature lower than a minimum value of a liquidus temperature within a range of compositional variations in which the amount of the third constituent in the metallic material decreases down to a point where the metallic material becomes substantially the second constituent so that the third constituent is selectively dissolved into the metal bath.

The metal member manufacturing method of the present invention employs a metallurgical technique which focuses on a property in which, if the metallic material including a compound, an alloy or a nonequilibrium alloy is placed in the metal bath, the third constituent is selectively caused to dissolve from the metallic material into the metal bath and remaining components become thickened while self-structuring fine openings, depending on heats of mixing with constituent components of the metal bath and heats of mixing thereof. Therefore, according to the metal member manufacturing method of the present invention, it is possible to easily manufacture a metal member having nanometer-scale fine pores by removing substances adhering to the fine openings thus formed even with various kinds of less noble metallic materials. Meanwhile, metallic materials usable in this invention include such semimetallic elements as tin, carbon, silicon, boron and germanium. Additionally, the first, second and third constituents are not limited each to a single kind of pure element but each constituent may be each structured with multiple kinds of elements.

According to the metal member manufacturing method of this invention, the metallic material made of a compound, an alloy or a nonequilibrium alloy containing both the second constituent and the third constituent is fabricated at first. Next, the first constituent having positive and negative heats of mixing with the second constituent and the third constituent, respectively, and having a lower melting point than the metallic material and the second constituent is selected. The metal bath is produced by heating the first constituent to a temperature higher than the melting point thereof but lower than the minimum value of the liquidus temperature within the range of compositional variations in which the amount of the third constituent in the metallic material decreases down to a point where the metallic material becomes substantially the second constituent.

The metallic material containing both the second constituent and the third constituent is placed in the metal bath made of the first constituent. During this process, the third constituent of the metallic material dissolves into the metal bath because the third constituent has a negative heat of mixing with the first constituent. At the same time, the second constituent remains on a surface of the metallic material without dissolving into the metal bath because the second constituent has a positive heat of mixing with the first constituent. Individual pieces of the second constituent repeatedly bind to other remaining pieces of the second constituent, thereby forming nanometer-sized particles. As these particles are partially bound together, nanometer-sized openings are self-structured. Additionally, it is possible to vary the size of the openings in a porous structure thus formed as well as porosity.

Preferably, the metal member manufacturing method according to the present invention is such that, after the metallic material has been lifted from the metal bath, only an adherent mixture including the first constituent and the third constituent adhering to a peripheral portion or inside the fine openings is selectively dissolved and removed by means of an acid or alkali aqueous solution. In this case, it is possible to manufacture a metal member provided with nanometer-scale fine pores from which the adherent mixture has been removed, the metal member containing the second constituent as a principal constituent, by using the acid or alkali aqueous solution which can selectively dissolve only the adherent mixture without dissolving the second constituent. Meanwhile, the adherent mixture to be removed adheres to the peripheral portion of the metallic material fabricated or inside the fine openings in part, or fills internal spaces of the fine openings.

Preferably, the metal member manufacturing method of the present invention is such that the first constituent is one of magnesium, calcium, bismuth and a rare-earth element or made of a mixture which is a compound or an alloy containing one of these substances as a principal constituent, the second constituent is made of a mixed solid which is a compound or an alloy containing one or a plurality of titanium, zirconium, niobium, tantalum, chromium, molybdenum, tungsten, iron and tin, and the third constituent is made of a mixed solid containing one or a plurality of copper, nickel, cobalt, iron and calcium.

The metal member manufacturing method of the present invention may be such that the metal member provided with a surface-reformed layer having fine openings is obtained by placing the metallic material in the metal bath to selectively cause the third constituent to dissolve from a surface layer of the metallic material into the metal bath. In this case, it is possible to manufacture a metal member having nanometer-scale fine pores only in the surface-reformed layer.

The metal member manufacturing method of the present invention may be such that the third constituent is made of nickel and the metallic material is made of a nickel-containing alloy. In this case, it is possible to manufacture a nickel-free metal member provided with fine pores formed as nickel dissolves into the metal bath and a remainder of the second constituent thickens. Here, the term "nickel-free" refers to an atomic percentage of 1.0 at. % or less of nickel in a material. When nickel is dissolved only from the surface layer of the metallic material, it is possible to manufacture a nickel alloy member having a nickel-free surface-reformed layer. Also, in this case, fine pores are formed only in the nickel-free surface-reformed layer, and the nickel-containing alloy having excellent mechanical characteristics and functional properties remains unchanged below (inside) the surface-reformed layer. Therefore, the metal member obtained is not deteriorated in terms of mechanical properties in an entirety of the material and offers a capability to prevent elution of nickel ions from the surface layer as well as excellent biocompatibility. Incidentally, it is necessary to adjust the period of time of immersion of the nickel-containing alloy in the metal bath such that advantages in mechanical properties of the material as an entirety thereof would not be lost as a result of an increase in the thickness of the surface-reformed layer.

The metal member manufacturing method of the present invention may be such that the metallic material is made of an alloy containing nickel and having titanium as a principal constituent, stainless steel containing nickel, or an alloy containing nickel and having cobalt and chromium as principal constituents. In this case, the metallic material is made of nitinol (Ti—Ni shape memory alloy), stainless steel alloy containing nickel like austenitic stainless steel SUS316L, or Co—Cr alloy containing nickel like ASTM-F90, F562 or F1058, for example.

A metal member according to the present invention is manufactured by the metal member manufacturing method of the present invention.

The metal member of this invention has nanometer-scale fine pores. If the metal member is made of a nickel-containing alloy obtained by dissolving nickel only from the surface layer of the metallic material, it is possible to suppress elution of nickel ions without loosing advantages in mechanical properties of the material as an entirety thereof and provide excellent biocompatibility.

Advantages of the Invention

According to the present invention, it is possible to provide a metal member manufacturing method and the metal member capable of facilitating the manufacture of a porous medium made of a less noble metallic material having nanometer-scale fine pores. Additionally, it is possible to provide a metal member manufacturing method and the metal member which make it possible to obtain a metal member having excellent biocompatibility capable of suppressing elution of nickel ions without loosing advantages in mechanical properties of a material as an entirety thereof.

DESCRIPTION of EMBODIMENTS

Modes of carrying out the present invention are described hereinbelow with reference to the drawings.

Figure 1:
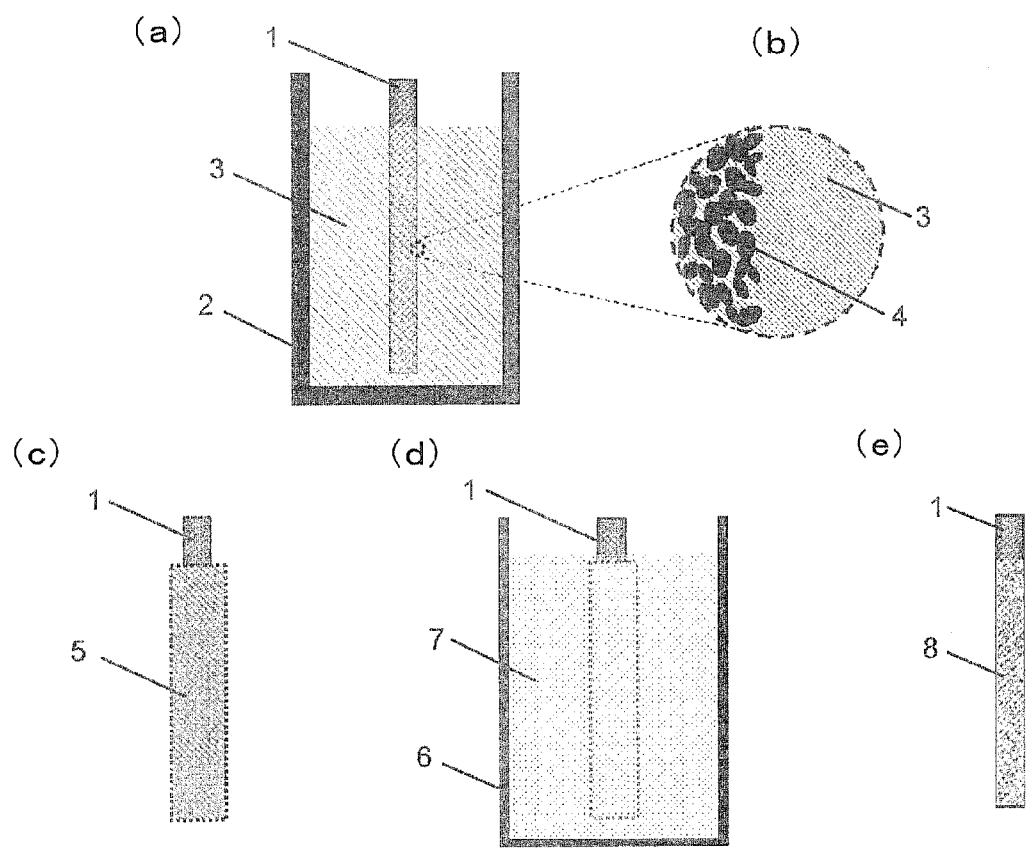
FIG. 1 is a representation of a method of manufacturing a metal member according to a first embodiment of the present invention including (a) a side elevation depicting a process of immersing a metallic material in a molten metal bath, (b) a side elevation providing an enlarged view of part of the metallic material, (c) a side elevation depicting the metallic material lifted from the molten metal bath, (d) a side elevation depicting a process of immersing the metallic material in an acid or alkali aqueous solution, and (e) a side elevation depicting the metallic material thus fabricated.
Figure 2:
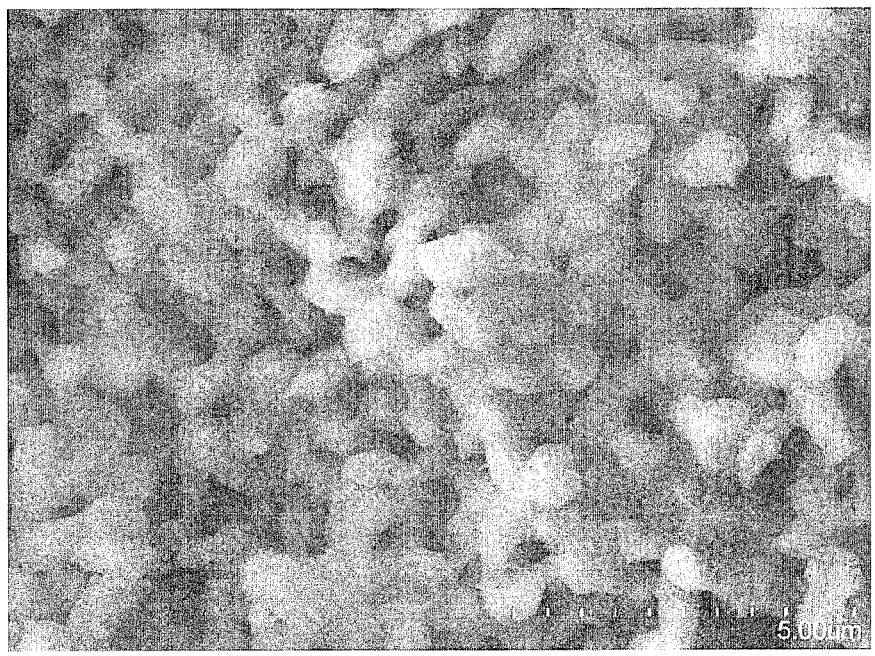
FIG. 2 is a microphotographic representation of a titanium-zirconium molded porous metal member fabricated by the manufacturing method of the first embodiment of the present invention.
Figure 3:
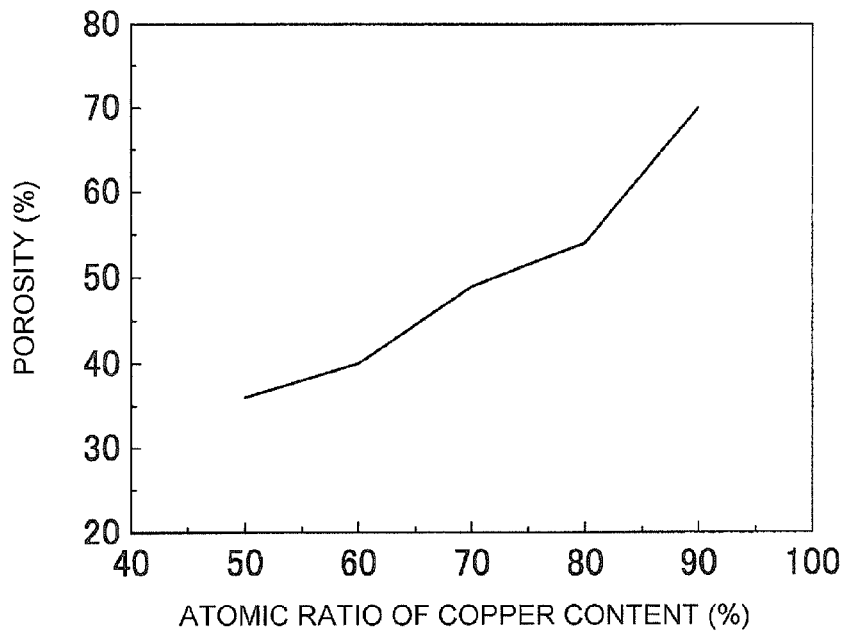
FIG. 3 is a graphic representation of a relationship between the atomic ratio of copper contained in the titanium-zirconium molded porous metallic material of FIG. 2 and the porosity of the fabricated metallic material.

FIGS. 1 to 3 illustrate a method of manufacturing a metal member and the metal member according to a first embodiment of the present invention.

First, the embodiment of the present invention is described with reference to an example in which a titanium member having fine pores is fabricated, using magnesium as a first constituent, titanium as a second constituent and copper as a third constituent. In this case, heats of mixing amounting to 16 kJ/mol, −9 kJ/mol and −3 kJ/mol are generated between magnesium and titanium, between titanium and copper, and between magnesium and copper, respectively, as calculated by using the Miedema's model (refer to MATERIALS TRANSACTIONS, Vol. 46, 2005, item 2818). Thus, as is understood from plus and minus signs of these values, titanium and copper, and magnesium and copper, respectively have a property of forming mixed media made of a compound or an alloy, for instance, whereas magnesium and titanium are separated into different phases.

In the beginning, a metallic material 1 containing titanium and copper as constituent components is prepared. As depicted in FIG. 1(a), this material 1 is placed in a molten metal bath (metal bath) 3 in a crucible 2 containing magnesium as a constituent component wherein the temperature of the molten metal bath 3 is regulated to a temperature lower than a minimum value of a liquidus temperature within a range of compositional variations in which the amount of copper in the metallic material 1 decreases down to a point where the metallic material 1 becomes substantially the titanium component. While the copper component within the metallic material 1 begins to dissolve into the molten metal bath 3 at this time, the titanium component is left on a surface of the metallic material 1 with individual pieces of the titanium component repeatedly joining with other remaining pieces of the titanium component, thus self-structuring nanometer-scale particulate matter 4 as depicted in FIG. 1(b). As pieces of this fine particulate matter 4 are partially bound together, there are formed nanometer-sized openings among those pieces and these openings are filled with the magnesium component with the copper component dissolved in.

The metallic material 1 which has been subjected to the above treatment is lifted from the molten metal bath 3 and cooled down to room temperature. There now exists an adherent mixture 5 of copper and magnesium adhering to a portion of the metallic material 1 which has been immersed in the molten metal bath 3, inside and outside the metallic material 1, as depicted in FIG. 1(c). By immersing this adherent mixture 5 portion of the metallic material 1 in an acid or alkali aqueous solution 7 in a vessel 6 as depicted in FIG. 1(d), only the adherent mixture 5 is dissolved into the acid or alkali aqueous solution 7 and removed. Subsequently, the metallic material 1 is lifted from the acid or alkali aqueous solution 7 and dried in the atmosphere, whereby a titanium molded metal member 8 having nanometer-scale fine pores can be fabricated as depicted in FIG. 1(e).

Next, examples of the first embodiment are described hereunder.

EXAMPLE 1

Approximately 30 g of $Cu_{70}Ti_{15}Zr_{15}$ of which composition had a Cu:Ti:Zr atomic ratio of 70:15:15 was produced in a pure argon gas atmosphere by an arc melting method. After mechanically pulverizing this master alloy, approximately 5 g of the master alloy was placed in a quartz nozzle measuring 7 mm in inside diameter and 70 mm in length, from which a cylindrical metallic material 1 measuring approximately 1 mm in diameter and 50 mm in length was fabricated using a copper mold casting technique in a pure argon gas atmosphere.

Next, 10 g of pure magnesium is placed in a graphite crucible 2 having an inside diameter of 30 mm and a depth of 50 mm and dissolved by high-frequency melting in the pure argon gas atmosphere to produce a molten metal bath 3 while regulating output so as to maintain a liquid temperature of 700° C. This temperature must be regulated to a temperature lower than a 900° C. minimum value of a liquidus temperature within a range of compositional variations in which the amount of the copper component in the $Cu_{70}Ti_{15}Zr_{15}$ alloy decreases down to a point where the $Cu_{70}Ti_{15}Zr_{15}$ alloy becomes substantially a $Ti_{50}Zr_{50}$ component. The cylindrical metallic material 1 was hung by a molybdenum wire, immersed in the magnesium molten metal bath 3 for approximately 1 second, and then pulled out into argon gas and cooled therein. During this process, the copper element in the cylindrical metallic material 1 dissolves into the magnesium molten metal bath 3, and remaining pieces of titanium and zirconium become repeatedly bound together, thereby creating fine alloy particulate matter 4 having a particle diameter of approximately 500 nm. Openings formed between these particulate matters 4 as pieces thereof are partially bound together are filled with an adherent mixture 5 made of the magnesium component in which copper has dissolved.

A portion of the cylindrical metallic material 1, where the adherent mixture 5 was present on the metallic material 1, which was lifted from the magnesium molten metal bath 3 and cooled was processed by placing the same in a nitric acid aqueous solution 7 in a beaker 6 regulated to a molar concentration of 0.1 for 30 minutes at room temperature so that the adherent mixture 5 made of the magnesium and copper components was dissolved and removed. Then, the metallic material 1 was lifted into the atmosphere and dried.

As a result, a $Ti_{50}Zr_{50}$ molded metal member 8 provided with nanometer-scale fine pores was fabricated as depicted in FIG. 2. An analysis of a cross-sectional image indicated a porosity of approximately 40%, from which a specific surface area defined as the ratio of the surface area of a titanium-zirconium phase to the volume of the titanium-zirconium phase was calculated to be approximately $2.4 \times 10^7$ m$^2$/m$^3$.

It is possible to control the porosity and specific surface area of the fabricated titanium-zirconium molded porous metal member 8 by altering the atomic ratio of titanium, zirconium and copper in the metallic material 1. Presented in FIG. 3 is a relationship between the atomic ratio of copper in the metallic material 1 and the porosity of the titanium-zirconium molded porous metal member 8 fabricated.

It is understood that the higher the atomic ratio of copper dissolved into the magnesium molten metal bath 3, the higher the porosity of the molded porous metal member 8 fabricated as depicted in FIG. 3.

EXAMPLE 2

Approximately 30 g of $Cu_{50}Ti_{30}Ag_{20}$ of which composition had a Cu:Ti:Ag atomic ratio of 50:30:20 was produced in a pure argon gas atmosphere by the arc melting method. After mechanically pulverizing this master alloy, approximately 5 g of the master alloy was placed in a quartz nozzle measuring 7 mm in inside diameter and 70 mm in length, from which a cylindrical metallic material 1 measuring approximately 1 mm in diameter and 50 mm in length was fabricated using the copper mold casting technique in a pure argon gas atmosphere.

Next, 10 g of pure magnesium was placed in a graphite crucible 2 having an inside diameter of 30 mm and a depth of 50 mm and dissolved by high-frequency melting in the pure argon gas atmosphere to produce a magnesium molten metal bath 3 while regulating output so as to maintain a liquid temperature of 700° C. This temperature must be regulated to a temperature lower than an approximately 950° C. minimum value of a liquidus temperature within a range of compositional variations in which the amounts of the copper and silver components in $Cu_{50}Ti_{30}Ag_{20}$ decrease down to a point where $Cu_{50}Ti_{30}Ag_{20}$ becomes substantially the titanium component. The cylindrical metallic material 1 was hung by a molybdenum wire, immersed in the magnesium molten metal bath 3 for approximately 1 second, and then pulled out into argon gas and cooled therein. During this process, the copper and silver elements in the cylindrical metallic material 1 dissolve into the magnesium molten metal bath 3, and remaining pieces of titanium become repeatedly bound together, thereby creating fine particulate matter 4 having a particle diameter of approximately 400 nm. Openings formed between these particulate matters 4 as pieces thereof are partially bound together are filled with an adherent mixture 5 made of the magnesium component in which copper and silver have dissolved.

The metallic material 1 which had been lifted from the magnesium molten metal bath 3 and cooled was processed by placing the same in a nitric acid aqueous solution 7 regulated to a molar concentration of 0.1 for 30 minutes at room temperature so that the adherent mixture 5 made of the magnesium, copper and silver components was dissolved and removed. Then, the metallic material 1 was lifted into the atmosphere and dried.

As a result, a titanium molded metal member 8 provided with nanometer-scale fine pores was fabricated. An analysis of a cross-sectional image indicated a porosity of approximately 43%, from which a specific surface area defined as the ratio of the surface area of a titanium phase to the volume of the titanium phase was calculated to be approximately $2.1 \times 10^7 \, m^2/m^3$.

EXAMPLE 3

Approximately 30 g of $Cu_{70}Ti_{30}$ of which composition had a Cu:Ti atomic ratio of 7:3 was produced in a pure argon gas atmosphere by the arc melting method. After mechanically pulverizing this master alloy, approximately 5 g of the master alloy was placed in a quartz nozzle measuring 7 mm in inside diameter and 70 mm in length, from which a cylindrical metallic material 1 measuring approximately 1 mm in diameter and 50 mm in length was fabricated using the copper mold casting technique in a pure argon gas atmosphere.

Next, approximately 10 g of pure magnesium was placed in a graphite crucible 2 having an inside diameter of 30 mm and a depth of 50 mm and dissolved by high-frequency melting in the pure argon gas atmosphere to produce a magnesium molten metal bath 3 while regulating output so as to maintain a liquid temperature of 700° C. This temperature must be regulated to a temperature lower than an 868° C. minimum value of a liquidus temperature within a range of compositional variations in which the amount of the copper component in the $Cu_{70}Ti_{30}$ alloy decreases down to a point where the $Cu_{70}Ti_{30}$ alloy becomes substantially the titanium component. The cylindrical metallic material 1 was hung by a molybdenum wire, immersed in the magnesium molten metal bath 3 for approximately 1 second, and then pulled out into argon gas and cooled therein. During this process, the copper element in the cylindrical metallic material 1 dissolves into the magnesium molten metal bath 3, and remaining pieces of titanium become repeatedly bound together, thereby creating fine particulate matter 4 having a particle diameter of approximately 400 nm. Openings formed between these particulate matters 4 as pieces thereof are partially bound together are filled with an adherent mixture 5 made of the magnesium component in which copper has dissolved.

A portion of the cylindrical metallic material 1 where the adherent mixture 5 was present on the metallic material 1 which was lifted from the magnesium molten metal bath 3 and cooled was processed by placing the same in a nitric acid aqueous solution 7 in a beaker 6 regulated to a molar concentration of 0.1 for 30 minutes at room temperature so that the adherent mixture 5 made of the magnesium and copper components was dissolved and removed. Then, the metallic material 1 was lifted into the atmosphere and dried.

As a result, a titanium molded metal member 8 provided with nanometer-scale fine pores was fabricated. An analysis of a cross-sectional image indicated a porosity of approximately 47%, from which a specific surface area defined as the ratio of the surface area of a titanium phase to the volume of the titanium phase was calculated to be approximately $2.4 \times 10^7 \, m^2/m^3$.

EXAMPLE 4

Approximately 30 g of $Cr_{30}Co_{70}$ of which composition had a Cr:Co atomic ratio of 3:7 was produced in a pure argon gas atmosphere by the arc melting method. After mechanically pulverizing this master alloy, approximately 6 g of the master alloy was placed in a quartz nozzle measuring 7 mm in inside diameter and 70 mm in length, from which a cylindrical metallic material 1 measuring approximately 1 mm in diameter and 50 mm in length was fabricated using the copper mold casting technique in a pure argon gas atmosphere.

Next, approximately 15 g of pure cerium was placed in a graphite crucible 2 having an inside diameter of 30 mm and a depth of 50 mm and dissolved by high-frequency melting in the pure argon gas atmosphere to produce a cerium molten metal bath 3 while regulating output so as to maintain a liquid temperature of 900° C. This temperature must be regulated to a temperature lower than a 1395° C. minimum value of a liquidus temperature within a range of compositional variations in which the amount of the cobalt component in the $Cr_{30}Co_{70}$ alloy decreases down to a point where the $Cr_{30}Co_{70}$ alloy becomes substantially the chrome component. The cylindrical metallic material 1 was hung by a molybdenum wire, immersed in the cerium molten metal bath 3 for approximately 1 second, and then pulled out into argon gas and cooled therein. During this process, the cobalt element in the cylindrical metallic material 1 dissolves into the cerium molten metal bath 3, and remaining pieces of chrome become repeatedly bound together, thereby creating fine particulate matter 4 having a particle diameter of approximately 700 nm. Openings formed between these particulate matters 4 as pieces thereof are partially bound together are filled with an adherent mixture 5 made of the cerium component in which cobalt has dissolved.

A portion of the cylindrical metallic material 1, where the adherent mixture 5 was present on the metallic material 1, which was lifted from the cerium molten metal bath 3 and cooled was processed by placing the same in a nitric acid aqueous solution 7 in a beaker 6 regulated to a molar concentration of 0.1 for 30 minutes at room temperature so that the adherent mixture 5 made of the cerium and cobalt components was dissolved and removed. Then, the metallic material 1 was lifted into the atmosphere and dried.

As a result, a chrome molded porous metal member 8 provided with nanometer-scale fine pores was fabricated. An analysis of a cross-sectional image indicated a porosity of approximately 35%, from which a specific surface area defined as the ratio of the surface area of a chrome phase to the volume of the chrome phase was calculated to be approximately $2.0 \times 10^7 \, m^2/m^3$.

EXAMPLE 5

Approximately 30 g of $Zr_{30}Cu_{70}$ of which composition had a Zr:Cu atomic ratio of 3:7 was produced in a pure argon gas atmosphere by the arc melting method. After mechanically pulverizing this master alloy, approximately 5 g of the master alloy was placed in a quartz nozzle measuring 7 mm in inside diameter and 70 mm in length, from which a cylindrical metallic material 1 measuring approximately 1 mm in diameter and 50 mm in length was fabricated using the copper mold casting technique in a pure argon gas atmosphere.

Next, approximately 15 g of pure cerium was placed in a graphite crucible 2 having an inside diameter of 30 mm and a depth of 50 mm and dissolved by high-frequency melting in the pure argon gas atmosphere to produce a cerium molten metal bath 3 while regulating output so as to maintain a liquid temperature of 830° C. This temperature must be regulated to a temperature lower than an 891° C. minimum value of a liquidus temperature within a range of compositional variations in which the amount of a copper component in the $Zr_{30}Cu_{70}$ alloy decreases to a point where the $Zr_{30}Cu_{70}$ alloy becomes substantially the zirconium component. The metallic material 1 was hung by a molybdenum wire, immersed in the cerium molten metal bath 3 for approximately 1 second, and then pulled out into argon gas and cooled therein. During this process, the copper element in the cylindrical metallic material 1 dissolves into the cerium molten metal bath 3, and remaining pieces of zirconium become repeatedly bound together, thereby creating fine particulate matter 4 having a particle diameter of approximately 600 nm. Openings formed between these particulate matters 4 as pieces thereof are partially bound together are filled with an adherent mixture 5 made of the cerium component in which copper has dissolved.

A portion of the cylindrical metallic material 1, where the adherent mixture 5 was present on the metallic material 1, which was lifted from the cerium molten metal bath 3 and cooled was processed by placing the same in a nitric acid aqueous solution 7 in a beaker 6 regulated to a molar concentration of 0.1 for 30 minutes at room temperature so that the adherent mixture 5 made of the cerium and copper components was dissolved and removed. Then, the metallic material 1 was lifted into the atmosphere and dried.

As a result, a zirconium molded porous metal member 8 provided with nanometer-scale fine pores was fabricated. An analysis of a cross-sectional image indicated a porosity of approximately 36%, from which a specific surface area defined as the ratio of the surface area of a zirconium phase to the volume of the zirconium phase was calculated to be approximately $2.0 \times 10^7$ m$^2$/m$^3$.

EXAMPLE 6

Approximately 30 g of $Mo_{30}Ni_{70}$ of which composition had a Mo:Ni atomic ratio of 30:70 was produced in a pure argon gas atmosphere by the arc melting method. From this master alloy, a cylindrical metallic material 1 measuring approximately 1 mm in diameter and 50 mm in length was fabricated using the copper mold casting technique in a pure argon gas atmosphere.

Next, approximately 15 g of pure cerium was placed in a graphite crucible 2 having an inside diameter of 30 mm and a depth of 50 mm and dissolved by high-frequency melting in the pure argon gas atmosphere to produce a cerium molten metal bath 3 while regulating output so as to maintain a liquid temperature of 1100° C. This temperature must be regulated to a temperature lower than a 1312° C. minimum value of a liquidus temperature within a range of compositional variations in which the amount of the nickel component in the $Mo_{30}Ni_{70}$ alloy decreases to a point where the $Mo_{30}Ni_{70}$ alloy becomes substantially the molybdenum component. The cylindrical metallic material 1 was hung by a molybdenum wire, immersed in the cerium molten metal bath 3 for approximately 1 second, and then pulled out into argon gas and cooled therein. During this process, the nickel element in the metallic material 1 dissolves into the cerium molten metal bath 3, and remaining pieces of molybdenum become repeatedly bound together, thereby creating fine particulate matter 4 having a particle diameter of approximately 700 nm. Openings formed between these particulate mattes 4 as pieces thereof are partially bound together are filled with an adherent mixture 5 made of the cerium component in which nickel has dissolved.

A portion of the cylindrical metallic material 1, where the adherent mixture 5 was present on the metallic material 1, which was lifted from the cerium molten metal bath 3 and cooled was processed by placing the same in a nitric acid aqueous solution 7 in a beaker 6 regulated to a molar concentration of 0.1 for 30 minutes at room temperature so that the adherent mixture 5 made of the cerium and nickel components was dissolved and removed. Then, the metallic material 1 was lifted into the atmosphere and dried.

As a result, a molybdenum molded porous metal member 8 provided with nanometer-scale fine pores was fabricated. An analysis of a cross-sectional image indicated a porosity of approximately 40%, from which a specific surface area defined as the ratio of the surface area of a molybdenum phase to the volume of the molybdenum phase was calculated to be approximately $1.9 \times 10^7$ m$^2$/m$^3$.

EXAMPLE 7

Approximately 30 g of $Ni_{70}W_{30}$ of which composition had a W:Ni atomic ratio of 30:70 was produced in a pure argon gas atmosphere by an electronic beam melting method. From this master alloy, a cylindrical metallic material 1 measuring approximately 1.5 mm in diameter and 30 mm in length was fabricated using an arc melting, slanted copper mold casting technique in a pure argon gas atmosphere.

Next, approximately 15 g of pure cerium was placed in a graphite crucible 2 having an inside diameter of 30 mm and a depth of 50 mm and dissolved by high-frequency melting in the pure argon gas atmosphere to produce a cerium molten metal bath 3 while regulating output so as to maintain a liquid temperature of 1600° C. This temperature must be regulated to a temperature lower than an approximately 1850° C. minimum value of a liquidus temperature within a range of compositional variations in which the amount of the nickel component in the $W_{30}Ni_{70}$ alloy decreases down to a point where the $W_{30}Ni_{70}$ alloy becomes substantially the tungsten component. The cylindrical metallic material 1 was hung by a molybdenum wire, immersed in the cerium molten metal bath 3 for approximately 1 second, and then pulled out into argon gas and cooled therein. During this process, the nickel element in the cylindrical metallic material 1 dissolves into the cerium molten metal bath 3, and remaining pieces of tungsten become repeatedly bound together, thereby creating fine particulate matter 4 having a particle diameter of approximately 700 nm. Openings formed between these particulate matters 4 as pieces thereof are partially bound together are filled with an adherent mixture 5 made of the cerium component in which nickel has dissolved.

A portion of the metallic material 1, where the adherent mixture 5 was present on the metallic material 1, which was lifted from the cerium molten metal bath 3 and cooled was processed by placing the same in a nitric acid aqueous solution 7 in a beaker 6 regulated to a molar concentration of 0.1 for 30 minutes at room temperature so that the adherent mixture 5 made of the cerium and nickel components was dissolved and removed. Then, the metallic material 1 was lifted into the atmosphere and dried.

As a result, a tungsten molded porous metal member 8 provided with nanometer-scale fine pores was fabricated. An analysis of a cross-sectional image indicated a porosity of approximately 30%, from which a specific surface area defined as the ratio of the surface area of a tungsten phase to the volume of the tungsten phase was calculated to be approximately $2.1 \times 10^7$ m$^2$/m$^3$.

EXAMPLE 8

Approximately 30 g of $Ta_{36}Ni_{64}$ of which composition had a Ta:Ni atomic ratio of 36:64 was produced in a pure argon gas atmosphere by the electronic beam melting method. After mechanically pulverizing this master alloy, approximately 7 g of the master alloy was placed in a quartz nozzle measuring 7 mm in inside diameter and 70 mm in length, from which a cylindrical metallic material 1 measuring approximately 1 mm in diameter and 50 mm in length was fabricated using the copper mold casting technique in a pure argon gas atmosphere.

Next, 15 g of pure cerium was placed in a graphite crucible 2 having an inside diameter of 30 mm and a depth of 50 mm and dissolved by high-frequency melting in the pure argon gas atmosphere to produce a cerium molten metal bath 3 while regulating output so as to maintain a liquid temperature of 900° C. This temperature must be regulated to a temperature lower than a 1395° C. minimum value of a liquidus temperature within a range of compositional variations in which the amount of the nickel in the $Ta_{36}Ni_{64}$ alloy decreases down to a point where the $Ta_{36}Ni_{64}$ alloy becomes substantially the tantalum component. The cylindrical metallic material 1 was hung by a molybdenum wire, immersed in the cerium molten metal bath 3 for approximately 1 second, and then pulled out into argon gas and cooled therein. During this process, the nickel element in the cylindrical metallic material 1 dissolves into the cerium molten metal bath 3, and remaining pieces of tantalum become repeatedly bound together, thereby creating fine particulate matter 4 having a particle diameter of approximately 700 nm. Openings formed between these particulate matters 4 as pieces thereof are partially bound together are filled with an adherent mixture 5 made of the cerium component into which nickel has dissolved.

A portion of the cylindrical metallic material 1, where the adherent mixture 5 was present on the metallic material 1, which was lifted from the cerium molten metal bath 3 and cooled was processed by placing the same in a nitric acid aqueous solution 7 in a beaker 6 regulated to a molar concentration of 0.1 for 30 minutes at room temperature so that the adherent mixture 5 made of the cerium and nickel components was dissolved and removed. Then, the metallic material 1 was lifted into the atmosphere and dried.

As a result, a tantalum molded porous metal member 8 provided with nanometer-scale fine pores was fabricated. An analysis of a cross-sectional image indicated a porosity of approximately 29%, from which a specific surface area defined as the ratio of the surface area of a tantalum phase to the volume of the tantalum phase was calculated to be approximately $1.8 \times 10^7$ m$^2$/m$^3$.

EXAMPLE 9

Approximately 30 g of $Fe_{50}Ti_{50}$ of which composition had a Fe:Ti atomic ratio of 50:50 was produced in a pure argon gas atmosphere by the arc melting method. After mechanically pulverizing this master alloy, approximately 7 g of the master alloy was placed in a quartz nozzle measuring 7 mm in inside diameter and 70 mm in length, from which a cylindrical metallic material 1 measuring approximately 1 mm in diameter and 50 mm in length was fabricated using the copper mold casting technique in a pure argon gas atmosphere.

Next, 15 g of pure samarium was placed in a graphite crucible 2 having an inside diameter of 30 mm and a depth of 50 mm and dissolved by high-frequency melting in the pure argon gas atmosphere to produce a samarium molten metal bath 3 while regulating output so as to maintain a liquid temperature of 1080° C. This temperature must be regulated to a temperature lower than an approximately 1085° C. minimum value of a liquidus temperature within a range of compositional variations in which the amount the iron component in the $Fe_{50}Ti_{50}$ alloy decreases down to a point where the $Fe_{50}Ti_{50}$ alloy becomes substantially the titanium component. The cylindrical metallic material 1 was hung by a molybdenum wire, immersed in the samarium molten metal bath 3 for approximately 1 second, and then pulled out into argon gas and cooled therein. During this process, the iron element in the cylindrical metallic material 1 dissolves into the samarium molten metal bath 3, and remaining pieces of titanium become repeatedly bound together, thereby creating fine particulate matter 4 having a particle diameter of approximately 400 nm. Openings formed between these particulate matters 4 as pieces thereof are partially bound together are filled with an adherent mixture 5 made of the samarium component from which iron has dissolved away.

A portion of the cylindrical metallic material 1, where the adherent mixture 5 was present on the metallic material 1, which was lifted from the samarium molten metal bath 3 and cooled was processed by placing the same in a nitric acid aqueous solution 7 in a beaker 6 regulated to a molar concentration of 0.1 for 30 minutes at room temperature so that the adherent mixture 5 made of the samarium and iron components was dissolved and removed. Then, the metallic material 1 was lifted into the atmosphere and dried.

As a result, a titanium molded porous metal member 8 provided with nanometer-scale fine pores was fabricated. An analysis of a cross-sectional image indicated a porosity of approximately 31%, from which a specific surface area defined as the ratio of the surface area of a titanium phase to the volume of the titanium phase was calculated to be approximately $2.2 \times 10^7$ m$^2$/m$^3$.

EXAMPLE 10

Approximately 30 g of $Cu_{70}Ti_{25.4}Zr_{1.7}Cr_{2.9}$ of which composition had a Cu:Ti:Zr:Cr atomic ratio of 70:25.4:1.7:2.9 was produced in a pure argon gas atmosphere by the arc melting method. After mechanically pulverizing this master alloy, approximately 5 g of the master alloy was placed in a quartz nozzle measuring 7 mm in inside diameter and 70 mm in length, from which a cylindrical metallic material 1 measuring approximately 1 mm in diameter and 50 mm in length was fabricated using the copper mold casting technique in a pure argon gas atmosphere.

Next, 10 g of pure magnesium was placed in a graphite crucible 2 having an inside diameter of 30 mm and a depth of 50 mm and dissolved by high-frequency melting in the pure argon gas atmosphere to produce a magnesium molten metal bath 3 while regulating output so as to maintain a liquid temperature of 800° C. This temperature must be regulated to a temperature lower than an approximately 868° C. minimum value of a liquidus temperature within a range of compositional variations in which the amount of the copper component in the $Cu_{70}Ti_{25.4}Zr_{1.7}Cr_{2.9}$ alloy decreases down to a point where the $Cu_{70}Ti_{25.4}Zr_{1.7}Cr_{2.9}$ alloy becomes substantially a $Ti_{84.7}Zr_{5.6}Cr_{9.7}$ component. The cylindrical metallic material 1 was hung by a molybdenum wire, immersed in the magnesium molten metal bath 3 for approximately 60 seconds, and then pulled out into argon gas and cooled therein. During this process, the copper element in the cylindrical metallic material 1 dissolves into the magnesium molten metal bath 3, and remaining pieces of titanium, zirconium and chrome become repeatedly bound together, thereby creating a fine particulate matter 4 having a particle diameter of approximately 500 nm. Openings formed between these particulate matters 4 as pieces thereof are partially bound together are filled with an adherent mixture 5 made of the magnesium component in which copper has dissolved.

A portion of the cylindrical metallic material 1, where the adherent mixture 5 was present on the metallic material 1, which was lifted from the magnesium molten metal bath 3 and cooled was processed by placing the same in a nitric acid aqueous solution 7 in a beaker 6 regulated to a molar concentration of 0.1 for 30 minutes at room temperature so that the adherent mixture 5 made of the magnesium and copper components was dissolved and removed. Then, the metallic material 1 was lifted into the atmosphere and dried.

As a result, a $Ti_{84.7}Zr_{5.6}Cr_{9.7}$ alloy molded porous metal member 8 provided with nanometer-scale fine pores was fabricated. A structural analysis performed by using the X-ray diffraction method (XRD) has verified that the crystal structure of a porous surface-reformed layer 9 has a body-centered cubic (bcc) structure. An analysis of a cross-sectional image indicated a porosity of approximately 31%, from which a specific surface area defined as the ratio of the surface area of a titanium-zirconium-chrome phase to the volume of the titanium-zirconium-chrome phase was calculated to be approximately $2.2 \times 10^7$ $m^2/m^3$.

EXAMPLE 11

Approximately 30 g of $Ni_{70}Fe_{23.4}Cr_{6.6}$ of which composition had a Ni:Fe:Cr atomic ratio of 70:23.4:6.6 was produced in a pure argon gas atmosphere by the arc melting method. After mechanically pulverizing this master alloy, approximately 5 g of the master alloy was placed in a quartz nozzle measuring 7 mm in inside diameter and 70 mm in length, from which a cylindrical metallic material 1 measuring approximately 1 mm in diameter and 50 mm in length was fabricated using the copper mold casting technique in a pure argon gas atmosphere.

Next, 10 g of pure magnesium was placed in a graphite crucible 2 having an inside diameter of 30 mm and a depth of 50 mm and dissolved by high-frequency melting in the pure argon gas atmosphere to produce a magnesium molten metal bath 3 while regulating output so as to maintain a liquid temperature of 900° C. This temperature must be regulated to a temperature lower than an approximately 1430° C. minimum value of a liquidus temperature within a range of compositional variations in which the amount of the nickel component in the $Ni_{70}Fe_{23.4}Cr_{6.6}$ alloy decreases down to a point where the $Ni_{70}Fe_{23.4}Cr_{6.6}$ alloy becomes substantially the $Fe_{78}Cr_{22}$ component. The cylindrical metallic material 1 was hung by a molybdenum wire, immersed in the magnesium molten metal bath 3 for approximately 60 seconds, and then pulled out into argon gas and cooled therein. During this process, the nickel element in the cylindrical metallic material 1 dissolves into the magnesium molten metal bath 3, and remaining pieces of iron and chrome become repeatedly bound together, thereby creating a fine particulate matter 4 having a particle diameter of approximately 800 nm. Openings formed between these particulate matters 4 as pieces thereof are partially bound together are filled with an adherent mixture 5 made of the magnesium component into which nickel has dissolved.

A portion of the cylindrical metallic material 1; where the adherent mixture 5 was present on the metallic material 1; which was lifted from the magnesium molten metal bath 3 and cooled was processed by placing the same in a nitric acid aqueous solution 7 in a beaker 6 regulated to a molar concentration of 0.1 for 30 minutes at room temperature so that the adherent mixture 5 made of the magnesium and nickel components was dissolved and removed. Then, the metallic material 1 was lifted into the atmosphere and dried.

As a result, a $Fe_{78}Cr_{22}$ alloy molded porous metal member 8 provided with nanometer-scale fine pores was fabricated. An analysis of a cross-sectional image indicated a porosity of approximately 31%, from which a specific surface area defined as the ratio of the surface area of a iron-chrome phase to the volume of the iron-chrome phase was calculated to be approximately $2.2 \times 10^7$ $m^2/m^3$.

Figure 4:
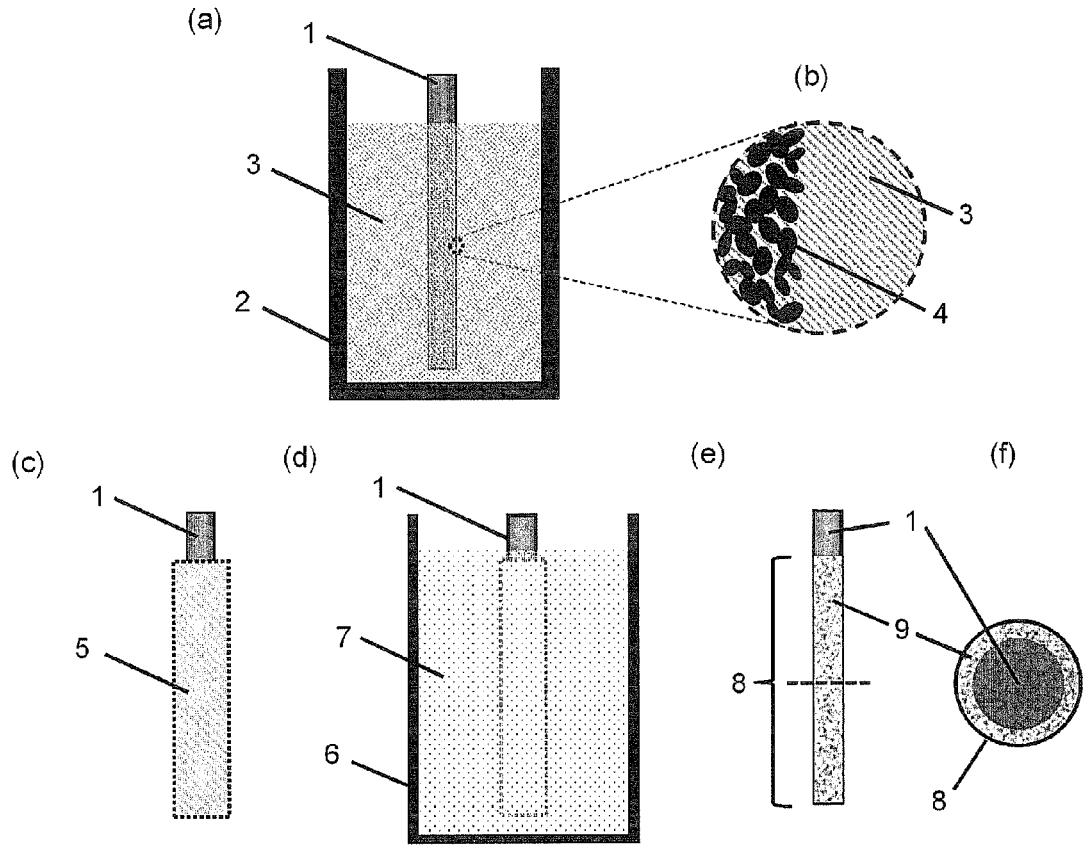
FIG. 4 is a representation of a method of manufacturing a metal member according to a second embodiment of the present invention including (a) a side elevation depicting a process of immersing a metallic material in a molten metal bath, (b) a side elevation providing an enlarged view of a part of the metallic material, (c) a side elevation depicting the metallic material lifted from the molten metal bath, (d) a side elevation depicting a process of immersing the metallic material in an acid or alkali aqueous solution, (e) a side elevation depicting the metallic material thus fabricated, and (f) an enlarged cross section taken at the position of a broken line in (e) depicting the metallic material fabricated.
Figure 5:
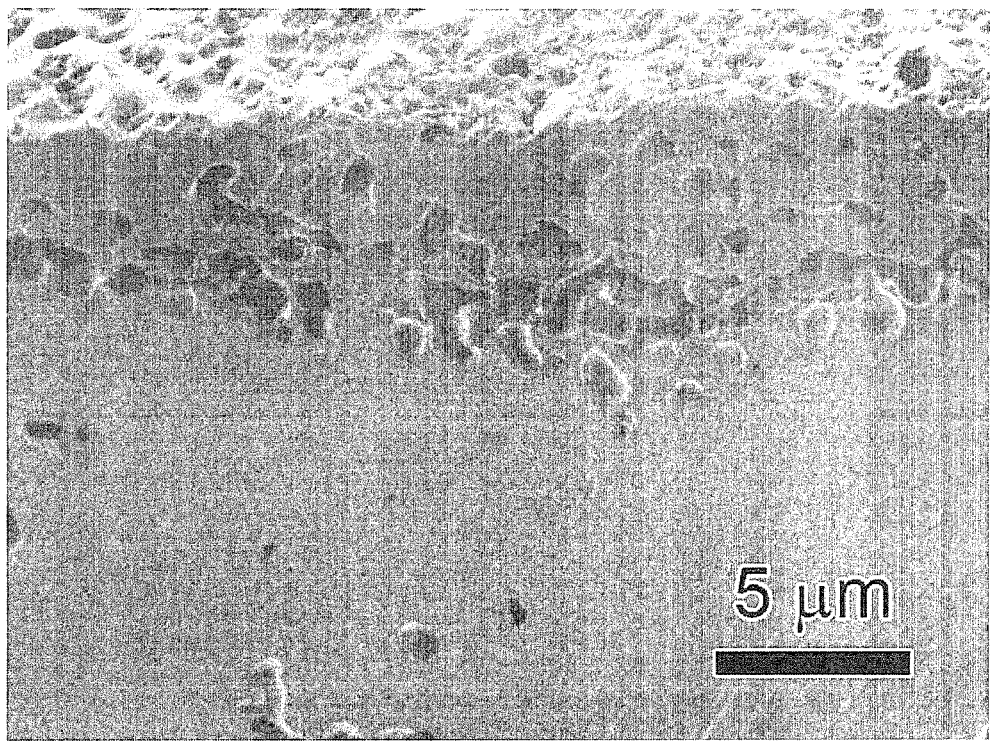
FIG. 5 is a microphotographic representation of a cross section of a nitinol wire metal member provided with a titanium surface-reformed layer fabricated by the manufacturing method of the second embodiment of the present invention.
Figure 6:
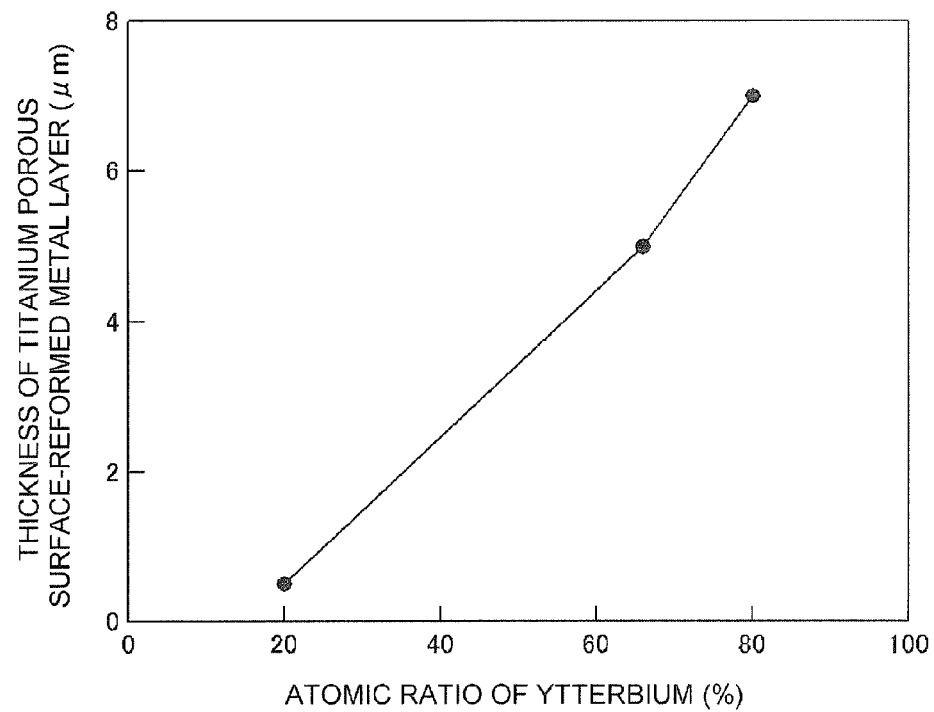
FIG. 6 is a graphic representation of a relationship between the atomic ratio of ytterbium contained in the molten metal bath and the thickness of the titanium surface-reformed layer of the nitinol wire metal member provided with the titanium surface-reformed layer fabricated by the manufacturing method of the second embodiment of the present invention when a Mg—Yb alloy component is used to prepare the molten metal bath.

FIGS. 4 to 6 illustrate a method of manufacturing a metal member and the metal member according to a second embodiment of the present invention.

First, the second embodiment of the present invention is described with reference to an example in which, using nitinol (Ti—Ni shape memory alloy wherein 48.5 to 51.5 atomic percent is nickel) as a metallic material, cerium as a first constituent, titanium as a second constituent and nickel as a third constituent, nickel is removed from a surface layer by dissolving the same, and a nitinol member having a surface-reformed layer provided with fine pores formed by residual titanium is fabricated.

When nitinol is used, heats of mixing amounting to +18 kJ/mol, −35 kJ/mol and −28 kJ/mol are generated between cerium and titanium, between titanium and nickel, and between cerium and nickel, respectively, as calculated by using the Miedema's model (refer to MATERIALS TRANSACTIONS, Vol. 46, 2005, item 2818-2819). Thus, as is understood from plus and minus signs of these values, titanium and nickel, and cerium and nickel, respectively have a property of forming mixed media made of a compound or an alloy, for instance, whereas cerium and titanium are separated into different phases.

As depicted in FIG. 4(a), a metallic material 1 made of nitinol is placed in a molten metal bath (metal bath) 3 of which constituent component is cerium in a titanium crucible 2, wherein the temperature of the molten metal bath 3 is regulated to a temperature lower than a minimum value of a liquidus temperature within a range of compositional variations in which the amount of nickel in nitinol decreases down to a point where the metallic material 1 becomes substantially the titanium component. While the nickel component on a surface of the metallic material 1 begins to dissolve into the molten metal bath 3 at this time, the titanium component is left on the surface of the metallic material 1 with individual pieces of the titanium component repeatedly joining with other remaining pieces of the titanium component, thus self-structuring a nanometer- to micrometer-scale particulate matter 4 as depicted in FIG. 4(b). As pieces of this fine particulate matter 4 are partially bound together, there are formed nanometer- to micrometer-sized openings among those pieces and these openings are filled with a cerium-based adherent mixture 5 mixed with the dissolved nickel component.

The metallic material 1 which has been subjected to the above surface treatment is lifted from the molten metal bath 3 and cooled down to room temperature. The adherent mixture 5, which adheres to the surface of the metallic material 1 or fills with the openings thereof, which has been immersed in the molten metal bath 3 as depicted in FIG. 4(c), is immersed in an acid or alkali aqueous solution 7 in a vessel 6 made of a glass beaker as depicted in FIG. 4(d). This causes only the adherent mixture 5 to be dissolved into the acid or alkali aqueous solution 7 and removed. Subsequently, the metallic material 1 is lifted from the acid or alkali aqueous solution 7 and dried in the atmosphere, whereby a nitinol metal member 8 having a titanium surface-reformed layer 9 provided with nanometer-to micrometer-scale fine pores can be fabricated as depicted in FIGS. 4(e) and 4(f).

Next, examples of the second embodiment are described hereunder.

EXAMPLE 12

A wire of nitinol (Ti—Ni shape memory alloy wherein 51 atomic percent is nickel) measuring 330 μm in diameter and 50 mm in length is prepared as a metallic material 1. Next, approximately 50 g of cerium was placed in a titanium crucible 2 having an inside diameter of 50 mm and a depth of 15 mm and dissolved by high-frequency melting in a pure argon gas atmosphere to produce a molten metal bath 3 while regulating output so as to maintain a liquid temperature of 850° C. This temperature must be regulated to a temperature lower than an approximately 942° C. minimum value of a liquidus temperature within a range of compositional variations in which the amount of nickel in nitinol decreases down to a point where the nitinol becomes substantially the titanium component.

The metallic material 1 made of the nitinol wire was immersed in the cerium molten metal bath 3 for approximately 240 seconds, and then pulled out into the argon gas atmosphere and cooled therein. During this process, nickel in a surface layer of the metallic material 1 dissolves into the cerium molten metal bath 3, and remaining pieces of titanium become repeatedly bound together, thereby creating a fine titanium particulate matter 4 having a particle diameter of approximately 1 μm. Openings formed between these particulate matters 4 as pieces thereof are partially bound together are filled with an adherent mixture 5 made of the cerium component into which nickel has dissolved.

A portion of the metallic material 1, where the adherent mixture 5 was formed in the surface layer of the metallic material 1, which was lifted from the cerium molten metal bath 3 and cooled was processed by placing the same in a nitric acid aqueous solution 7 in a beaker 6 regulated to a concentration of 30% for 30 minutes at room temperature so that the adherent mixture 5 made of the cerium and nickel components was dissolved and removed. Then, the metallic material 1 was lifted into the atmosphere and dried.

As a result, a nitinol wire provided with a porous titanium surface-reformed layer 9 having approximately 1-μm-sized openings through a thickness of 5 μm below the surface as depicted in FIG. 5 was fabricated. An element analysis performed by using energy dispersive X-ray spectrophotometry (EDS) has verified that nickel decreased down to 0.9 atomic percent whereas titanium was thickened up to 99 atomic percent within the titanium surface-reformed layer 9.

It is possible to control the thickness of the titanium surface-reformed layer 9 produced on the nitinol surface by preparing the molten metal bath 3 in the form of an alloy component made of ytterbium which is a rare-earth element like cerium and magnesium of which denickelification speed is lower than that of ytterbium and varying the atomic ratio of ytterbium. Presented in FIG. 6 is a relationship between the atomic ratio of ytterbium in the molten metal bath 3 and the thickness of the titanium surface-reformed layer 9 produced. Meanwhile, this relationship was obtained under conditions where the temperature of the molten metal bath 3 was 850° C. and the period of time of immersion of nitinol was kept constant at about 240 seconds.

It is understood that the larger the atomic ratio of ytterbium of which denickelification speed is high as compared to that of magnesium, the thicker the titanium surface-reformed layer 9 produced as depicted in FIG. 6.

EXAMPLE 13

A SUS316L plate measuring 10 mm in width, 30 mm in length and 1 mm in thickness is prepared as a metallic material 1. Meanwhile, SUS316L is a typical type of austenitic stainless steel that is characterized by excellent corrosion resistance, magnetism, extensibility, machinability and weldability, particularly by excellent pitting corrosion resistance and intercrystalline corrosion resistance. Next, approximately 10 g of pure magnesium was placed in a graphite crucible 2 having an inside diameter of 30 mm and a depth of 50 mm and dissolved by high-frequency melting in a pure argon gas atmosphere to produce a molten metal bath 3 while regulating output so as to maintain a liquid temperature of 800° C. This temperature must be regulated to a temperature lower than an approximately 1450° C. minimum value of a liquidus temperature within a range of compositional variations in which the amount of a nickel component in SUS316L decreases down to a point where components of SUS316L excluding dissolvable components like nickel would be left.

The metallic material 1 made of the SUS316L plate was hung by a molybdenum wire, immersed in the magnesium molten metal bath 3 for approximately 60 seconds, and then pulled out into the argon gas atmosphere and cooled therein. During this process, nickel in a surface layer of the metallic material 1 dissolves into the magnesium molten metal bath 3, and pieces of the remaining components become repeatedly bound together, thereby forming dimply fine openings measuring approximately 3 μm in diameter. An adherent mixture 5 made of the magnesium component into which nickel has dissolved adheres to surfaces of these fine openings.

A portion of the metallic material 1, where the adherent mixture 5 was formed in the surface layer of the metallic material 1, which was lifted from the magnesium molten metal bath 3 and cooled was processed by placing the same in a nitric acid aqueous solution 7 in a beaker 6 regulated to a concentration of 30% for 30 minutes at room temperature so that the adherent mixture 5 made of the magnesium and nickel components was dissolved and removed. Then, the metallic material 1 was lifted into the atmosphere and dried.

As a result, a SUS316L metal member 8 provided with a surface-reformed layer 9 having fine pores made of approximately 3-μm-sized openings through a thickness of 8 μm below the surface was fabricated. An element quantity analysis performed by using energy dispersive X-ray spectrophotometry (EDS) has verified that the concentration of nickel in the surface-reformed layer 9 decreased down to 0.8 atomic percent.

EXAMPLE 14

An ASTM-F90 plate measuring 10 mm in width, 30 mm in length and 1 mm in thickness is prepared as a metallic material 1. Meanwhile, ASTM-F90 alloy is an alloy characterized by excellent plasticity and machinability, containing cobalt as a principal constituent as well as 19.0% to 21.0% by weight of chrome, 14.0% to 16.0% by weight of tungsten, 9.0% to 11.0% by weight of nickel, 0.05% to 0.15% by weight of carbon, 1.0% to 2.0% by weight of manganese, a maximum of 3% by weight of iron and a maximum of 0.4% by weight of silicon. Next, approximately 10 g of pure magnesium was placed in a graphite crucible 2 having an inside diameter of 30 mm and a depth of 50 mm and dissolved by high-frequency melting in a pure argon gas atmosphere to produce a molten metal bath 3 while regulating output so as to maintain a liquid temperature of 950° C. This temperature must be regulated to a temperature lower than an approximately 1410° C. minimum value of a liquidus temperature within a range of compositional variations in which the amount of the nickel component in ASTM-F90 decreases down to a point where components of ASTM-F90 excluding dissolvable components like nickel would be left.

The metallic material 1 made of the ASTM-F90 plate was hung by a molybdenum wire, immersed in the magnesium molten metal bath 3 for approximately 300 seconds, and then pulled out into the argon gas atmosphere and cooled therein. During this process, nickel in a surface layer of the metallic material 1 dissolves into the magnesium molten metal bath 3, and pieces of the remaining nickel-free components become repeatedly bound together, thereby forming a surface-reformed layer 9 having dimply fine openings measuring approximately 1.5 μm in diameter. A nickel adherent mixture 5 made of the magnesium component into which nickel has dissolved adheres to surfaces of these fine openings.

A portion of the metallic material 1, where the adherent mixture 5 was formed in the surface layer of the metallic material 1, which was lifted from the magnesium molten metal bath 3 and cooled was processed by placing the same in a hydrochloric acid aqueous solution 7 in a beaker 6 regulated to a concentration of 30% for 30 minutes at room temperature so that the adherent mixture 5 made of the magnesium and nickel components was dissolved and removed. Then, the metallic material 1 was lifted into the atmosphere and dried.

As a result, a nickel-free ASTM-F90 metal member 8 provided with a surface-reformed layer 9 having approximately 1.5-μm-sized dimply fine pores through a thickness of 3 μm below the surface was fabricated. An element quantity analysis performed by using energy dispersive X-ray spectrophotometry (EDS) has verified that the concentration of nickel in the porous surface-reformed layer 9 decreased down to 0.7 atomic percent.

EXAMPLE 15

An ASTM-F562 plate measuring 10 mm in width, 30 mm in length and 1 mm in thickness is prepared as a metallic material 1. Meanwhile, ASTM-F562 alloy is a cobalt alloy characterized by excellent strength, extensibility and corrosion resistance, containing 19.0% to 21.0% by weight of chrome, 9.0% to 10.5% by weight of molybdenum, 33.0% to 37.0% by weight of nickel, a maximum of 0.025% by weight of carbon, 0.15% by weight of manganese, a maximum of 1.0% by weight of iron, a maximum of 0.15% by weight of silicon and a maximum of 1.0% by weight of titanium. Next, approximately 10 g of pure magnesium was placed in a graphite crucible 2 having an inside diameter of 30 mm and a depth of 50 mm and dissolved by high-frequency melting in a pure argon gas atmosphere to produce a molten metal bath 3 while regulating output so as to maintain a liquid temperature of 850° C. This temperature must be regulated to a temperature lower than an approximately 1440° C. minimum value of a liquidus temperature within a range of compositional variations in which the amount of the nickel component in ASTM-F562 decreases down to a point where components of ASTM-562 excluding dissolvable components like nickel would be left.

The metallic material 1 made of the ASTM-F562 plate was hung by a molybdenum wire, immersed in the magnesium molten metal bath 3 for approximately 300 seconds, and then pulled out into the argon gas atmosphere and cooled therein. During this process, nickel in a surface layer of the metallic material 1 dissolves into the magnesium molten metal bath 3, and pieces of the remaining nickel-free components become repeatedly bound together, thereby forming a surface-reformed layer 9 having dimply fine openings measuring approximately 3 μm in diameter. A nickel adherent mixture 5 made of the magnesium component into which nickel has dissolved adheres to surfaces of these fine openings.

A portion of the metallic material 1 where the adherent mixture 5 was formed in the surface layer of the metallic material 1 which was lifted from the magnesium molten metal bath 3 and cooled was processed by placing the same in a hydrochloric acid aqueous solution 7 in a beaker 6 regulated to a concentration of 30% for 30 minutes at room temperature so that the adherent mixture 5 made of the magnesium and nickel components was dissolved and removed. Then, the metallic material 1 was lifted into the atmosphere and dried.

As a result, a nickel-free ASTM-F562 metal member 8 provided with a surface-reformed layer 9 having approximately 3-μm-sized dimply fine pores through a thickness of 5 μm below the surface was fabricated. An element quantity analysis performed by using energy dispersive X-ray spectrophotometry (EDS) has verified that the concentration of nickel in the porous surface-reformed layer 9 decreased down to 0.9 atomic percent.

EXAMPLE 16

An ASTM-F1058 grade-1 plate measuring 10 mm in width, 30 mm in length and 1 mm in thickness is prepared as a metallic material 1. Meanwhile, ASTM-F1058 grade-1 alloy is an iron alloy characterized by particularly excellent machinability, containing 19.0% to 21.0% by weight of chrome, 6.0% to 8.0% by weight of molybdenum, 14.0% to 16.0% by weight of nickel, a maximum of 0.025% by weight of carbon, 1.5% to 2.5% by weight of manganese, a maximum of 1.20% by weight of silicon, a maximum of 0.1% by weight of beryllium and 39.0% to 41.0% by weight of cobalt. Next, approximately 10 g of pure magnesium was placed in a graphite crucible 2 having an inside diameter of 30 mm and a depth of 50 mm and dissolved by high-frequency melting in a pure argon gas atmosphere to produce a molten metal bath 3 while regulating output so as to maintain a liquid temperature of 900° C. This temperature must be regulated to a temperature lower than an approximately 1460° C. minimum value of a liquidus temperature within a range of compositional variations in which the amount of the nickel component in ASTM-F1058 grade-1 decreases down to a point where components of ASTM-F1058 grade-1 excluding dissolvable components like nickel would be left.

The metallic material 1 made of the ASTM-F1058 grade-1 plate was hung by a molybdenum wire, immersed in the magnesium molten metal bath 3 for approximately 300 seconds, and then pulled out into the argon gas atmosphere and cooled therein. During this process, nickel in a surface layer of the metallic material 1 dissolves into the magnesium molten metal bath 3, and pieces of the remaining nickel-free components become repeatedly bound together, thereby structuring a surface-reformed layer 9 having dimply fine openings measuring approximately 3 μm in diameter. A nickel adherent mixture 5 made of the magnesium component into which nickel has dissolved adheres to surfaces of these fine openings.

A portion of the metallic material 1, where the adherent mixture 5 was formed in the surface layer of the metallic material 1, which was lifted from the magnesium molten metal bath 3 and cooled was processed by placing the same in a hydrochloric acid aqueous solution 7 in a beaker 6 regulated to a concentration of 30% for 30 minutes at room temperature so that the adherent mixture 5 made of the magnesium and nickel components was dissolved and removed. Then, the metallic material 1 was lifted into the atmosphere and dried.

As a result, a nickel-free ASTM-F1058 grade-1 metal member 8 provided with a surface-reformed layer 9 having approximately 3-μm-sized dimply fine pores through a thickness of 5 μm below the surface was fabricated. An element quantity analysis performed by using energy dispersive X-ray spectrophotometry (EDS) has verified that the concentration of nickel in the porous surface-reformed layer 9 decreased down to 0.8 atomic percent.

REFERENCE SIGNS LISTS

1 Metallic material
2 Crucible
3 Molten metal bath
4 Particulate matter
5 Adherent mixture
6 Vessel
7 (Acid or alkali) aqueous solution
8 Metal member
9 Surface-reformed layer

The invention claimed is:

1. A metal member manufacturing method for obtaining a metal member having fine openings, the method comprising:
placing a metallic material containing a second constituent and a third constituent in a molten metal bath of a first constituent, wherein the second constituent and the third constituent respectively have positive and negative heats of mixing relative to the first constituent, and the metallic material includes a compound, an alloy, or a nonequilibrium alloy each having a melting point that is higher than the solidifying point of the molten metal bath; and
selectively dissolving the third constituent into the molten metal bath by controlling the temperature of the molten metal bath to a temperature lower than a minimum liquidus temperature within a range of liquidus temperatures of each compositional variation of the metallic material in which an amount of the third constituent in the metallic material varies from an amount of the third constituent present in the metallic material before the metallic material is placed in the molten metal bath to where an amount of the third constituent present in the metallic material is none.

2. The metal member manufacturing method according to claim 1, further comprising:
lifting the metallic material from the molten metal bath; and
selectively dissolving and removing an adherent mixture including the first constituent and the third constituent adhering to a peripheral portion of or inside fine openings of the metallic material with an acid or alkali aqueous solution.

3. The metal member manufacturing method according to claim 1, wherein the first constituent is one of magnesium, calcium, bismuth and a rare-earth element or made of a mixture which is a compound or an alloy containing one of these substances as a principal constituent, the second constituent is a mixed solid which is a compound or an alloy containing one or a plurality of titanium, zirconium, niobium, tantalum, chromium, molybdenum, tungsten, iron and tin, and the third constituent is a mixed solid containing one or a plurality of copper, nickel, cobalt, iron and calcium.

4. A method for providing a metal member with a surface-reformed layer having fine openings, the method comprising:
placing a metallic material containing a second constituent and a third constituent in a molten metal bath of a first constituent, wherein the second constituent and the third constituent respectively have positive and negative heats of mixing relative to the first constituent, and the metallic material includes a compound, an alloy, or a nonequilibrium alloy each having a melting point that is higher than the solidifying point of the molten metal bath; and
selectively dissolving the third constituent from a surface layer of the metallic material into the metal bath by controlling the temperature of the molten metal bath to a temperature lower than a minimum liquidus temperature within a range of liquidus temperatures of each compositional variation of the metallic material in which an amount of the third constituent in the metallic material varies from an amount of the third constituent present in the metallic material before the metallic material is placed in the molten metal bath to where an amount of the third constituent present in the metallic material is none.

5. The metal member manufacturing method according to claim 1, wherein the third constituent is nickel and the metallic material is a nickel-containing alloy.

6. The metal member manufacturing method according to claim 5, wherein the metallic material is an alloy containing nickel and having titanium as a principal constituent, stainless steel containing nickel, or an alloy containing nickel and having cobalt and chromium as principal constituents.

7. The method according to claim 4, further comprising:
lifting the metallic material from the molten metal bath; and
selectively dissolving and removing an adherent mixture including the first constituent and the third constituent adhering to a peripheral portion of or inside fine openings of the metallic material with an acid or alkali aqueous solution.

8. The method according to claim 4, wherein the first constituent is one of magnesium, calcium, bismuth and a rare-earth element or made of a mixture which is a compound or an alloy containing one of these substances as a principal constituent, the second constituent is a mixed solid which is a compound or an alloy containing one or a plurality of titanium, zirconium, niobium, tantalum, chromium, molybdenum, tungsten, iron and tin, and the third constituent is a mixed solid containing one or a plurality of copper, nickel, cobalt, iron and calcium.

9. The method according to claim 4, wherein the third constituent is nickel and the metallic material is a nickel-containing alloy.

10. The method according to claim 9, wherein the metallic material is an alloy containing nickel and having titanium as a principal constituent, stainless steel containing nickel, or an alloy containing nickel and having cobalt and chromium as principal constituents.

* * * * *